United States Patent [19]

Rokukawa

[11] 4,382,068

[45] May 3, 1983

[54] METHOD FOR SELECTIVE RECOVERY OF MOLYBDENUM AND VANADIUM VALUES FROM SPENT CATALYSTS

[75] Inventor: Naganori Rokukawa, Tsuchiura, Japan

[73] Assignee: Director-General of the Agency of Industrial Science and Technology, Tokyo, Japan

[21] Appl. No.: 322,290

[22] Filed: Nov. 17, 1981

[30] Foreign Application Priority Data

Dec. 2, 1980 [JP] Japan .................... 55-169937

[51] Int. Cl.$^3$ .................... C01G 39/00; C01G 31/00
[52] U.S. Cl. .................... 423/53; 252/412; 423/68
[58] Field of Search .................... 252/412, 420, 411 S; 75/101 R; 423/53, 54, 68, 150

[56] References Cited

U.S. PATENT DOCUMENTS

| Re. 22,097 | 5/1942 | Wells .................... 252/412 |
| 3,562,150 | 2/1971 | Hamilton et al. .................... 208/216 |
| 3,959,436 | 5/1976 | Watts .................... 75/101 R |
| 4,087,510 | 5/1978 | Steenken .................... 423/68 |

FOREIGN PATENT DOCUMENTS 53-52290 5/1978 Japan .................... 252/420

*Primary Examiner*—P. E. Konopka
*Attorney, Agent, or Firm*—Brisebois & Kruger

[57] ABSTRACT

The invention provides a novel method for selectively recovering molybdenum and vanadium values from a spent catalyst used for the hydrogenation desulfurization of petroleums by the extraction with an alkaline extractant solution without the necessity of preliminary calcination of the spent catalyst containing, in addition to the molybdenum and vanadium values, nickel, cobalt and other heavy metals as well as sulfur and carbonaceous matters as the contaminants supported by or deposited on an alumina carrier. The inventive method utilizes an aqueous alkaline solution of sodium carbonate with admixture of hydrogen peroxide as an oxidizing agent whereby an unexpectedly high percent extraction is obtained for the molybdenum and vanadium values reaching 99% or higher for the former and about 85% for the latter while the extraction of nickel, cobalt and aluminum can be minimized.

10 Claims, No Drawings

METHOD FOR SELECTIVE RECOVERY OF MOLYBDENUM AND VANADIUM VALUES FROM SPENT CATALYSTS

BACKGROUND OF THE INVENTION

The present invention relates to a method for selectively recovering molybdenum and vanadium values from spent catalysts used for desulfurization of petroleums or, more particularly, relates to a method for selectively recovering simultaneously the molybdenum and vanadium values contained in spent catalysts used in the catalytic hydrogenation desulfurization of heavy oils by the technique of extraction.

As is well known, hydrogenation desulfurization of petroleums or, in particular, heavy oils is carried out usually by the catalytic reaction on a solid catalyst of molybdenum and cobalt supported on a carrier such as alumina. When the desulfurization reaction is run with a charge of the catalyst continuously over a long period of time, the catalyst is worn out and the catalytic activity thereof is decreased to such an extent that the reaction can proceed no longer at an industrially satisfactory velocity and with a desirable efficiency for desulfurization due to the deposition of heavy metals such as vanadium, nickel and the like as well as carbon, sulfur and the like contaminants originating in the heavy oil so that the catalyst thus worn out must be discharged out of the reactor as a spent catalyst and replaced with a new charge of the fresh catalyst.

It is highly desirable that the heavy metals and other components of value should be removed and recovered from the spent catalyst as completely as possible before the spent catalyst is discarded with objects not only to obtain economical advantages by the recovered values but also to prevent possible environmental pollution caused by the noxious or toxic ingredients such as the heavy metals contained in the spent catalyst.

Several methods are known for recovering heavy metals from such spent catalysts. These methods basically utilize the extraction of the heavy metal values with an aqueous acid or an alkali solution. Since the direct extraction treatment of the spent catalyst discharged out of the desulfurization reactor cannot give a satisfactory extraction of any one of the heavy metal values because these metal components are contained in the spent catalyst at least partly in the form of sulfides and/or lower oxides of the metals, it is conventional that the spent catalyst is calcined and oxidized at a relatively high temperature of 500° C. or higher before extraction with an acid or alkali in order to convert all of the heavy metals content to the oxide forms readily decomposable and extractable by the acid or alkali. This process involving the oxidizing calcination of the spent catalyst is disadvantageous due to the necessary expensive facilities for the calcination and for the removal of noxious materials contained in the exhaust gas such as the sulfur dioxide and the smoke or soot produced by the combustion of the sulfur and carbonaceous or oily matters contained in the spent catalyst.

Alternatively, improved methods have been proposed for the extraction of the metal values from the spent catalyst without the step of preliminary calcination. In one of the methods, the spent catalyst is first treated with an aqueous caustic alkali solution to have the contents of molybdenum, vanadium and aluminum extracted into the alkali solution and then the residue of the above first extraction is treated with sulfuric acid to have the contents of nickel and cobalt extracted into the acid. In another of the methods, the spent catalyst is first subjected to leaching of nickel and cobalt in an oxidizing pressurized condition in the presence of water and the residue of the leaching is then subjected to the treatment with an alkali solution to have the contents of molybdenum and vanadium leached out into the alkali solution.

In the former method above, most part of the alumina component of the carrier is extracted by the alkali solution so that the subsequent process for the separation of molybdenum and vanadium from aluminum is necessarily complicated. In the extraction of the spent catalyst with water in the latter method, considerable amounts of the molybdenum and vanadium contents are extracted already in this first step so that difficulties are encountered in the clear-cut separation of these metals from nickel and cobalt. In addition, both of these methods are carried out at or above 120° C. so that use of a pressurizable reaction vessel, i.e. autoclave, is indispensable.

In view of the above problems in the prior art methods, the inventor has undertaken investigations for developing an efficient method for the recovery of metal values from the spent catalyst used in the hydrogenation desulfurization of heavy oils with particular efforts to discover an extractant system with which the molybdenum and vanadium values can be selectively extracted with minimum extraction of the aluminum from the alumina carrier. The conclusion arrived at as a result of the investigations is that, among the alkaline extractants studied, i.e. sodium carbonate, ammonium carbonate, sodium hydroxide, ammonium hydroxide and others, best results are obtained with sodium carbonate in respect of the selectivity of the extraction of the molybdenum and vanadium contents.

Unfortunately, the use of a sodium carbonate solution alone as the extractant alkaline solution cannot give sufficiently high extraction of the molybdenum and vanadium contents. In an example, the use of an aqueous solution of a concentration of 160 g of $Na_2CO_3$ per liter gave only 48.6%, 50.4%, 0.5%, 1.2% and 2.7% of extraction of the molybdenum, vanadium, nickel, cobalt and aluminum contents, respectively, in a spent catalyst.

SUMMARY OF THE INVENTION

The reason for the above described impractically low extraction of the molybdenum and vanadium values with the sodium carbonate extractant from the spent catalyst is, in the inventor's view, presumably that at least part of the metallic constituents in the spent catalyst is in the state of sulfides and/or lower oxides. Accordingly, the inventor has come to an idea that addition of an oxidizing agent might be effective for increasing the extraction of these metals and the extensive investigation undertaken by him led to a discovery that an unexpectedly satisfactory result can be obtained by the addition of hydrogen peroxide to the sodium carbonate extractant solution for the treatment of a spent catalyst.

Thus the method of the present invention for the selective recovery of the molybdenum and vanadium values from a spent catalyst used for the desulfurization of petroleums containing the ingredients of molybdenum, vanadium, nickel, cobalt, sulfur and carbon supported by or deposited on an alumina catalyst carrier comprises subjecting the spent catalyst to the extraction with an aqueous extractant solution containing sodium carbonate and hydrogen peroxide followed by the separation of the extractant solution from the undissolved residue.

The above described method of the present invention is very effective not only in the unexpectedly high extraction of molybdenum and vanadium values reaching, for example, 99% or higher for molybdenum but also in the selectivity of the extraction with almost unchanged or rather decreased extraction of the cobalt, nickel and aluminum constituents by the addition of the hydrogen peroxide to the extractant solution even by the extraction at room temperature and under normal pressure.

DETAILED DESCRIPTION OF THE PREFERRED EMBODIMENTS

As is described in the above, the inventive method is characteristic in the addition of hydrogen peroxide to the sodium carbonate extractant solution for the extraction treatment of a spent catalyst containing molybdenum and vanadium values.

Such a spent catalyst usually contains, as the metallic constituents, 3 to 5% by weight of molybdenum, 3 to 11% by weight of vanadium, 2 to 5% by weight of nickel, 0.5 go 2% by weight of cobalt and 20 to 30% by weight of aluminum. The spent catalyst as discharged from the desulfurization reactor is usually in the form of granules or pellets so that it is preferable to pulverize the spent catalyst as finely as possible before it is subjected to the extraction treatment according to the inventive method. The pulverized spent catalyst should have a particle size distribution to pass a 48 mesh screen or, preferably, a 100 mesh screen by the Tyler standard series.

The preferable concentrations of sodium carbonate and hydrogen peroxide are, although dependent on the types of the spent catalyst, in the ranges from 10 to 200 g/liter for the former as $Na_2CO_3$ and from 1 to 10% by weight for the latter as $H_2O_2$. In preparing the extractant solution, an aqueous solution of sodium carbonate is first prepared and an aqueous solution of hydrogen peroxide is then added to the solution either at one time or in portions. It is recommended that a commercially available aqueous hydrogen peroxide solution in a concentration of about 30% is added portionwise to the sodium carbonate solution, in particular, when a relatively high concentration of the hydrogen peroxide is desired in the extractant solution.

The spent catalyst, preferably in a finely divided form, is added to the thus prepared extractant solution and agitated. Care must be taken in this case that the addition of the spent catalyst to the solution should be carried out with caution to avoid any accident by the splashing of the alkaline liquid because the decomposition of hydrogen peroxide in the extractant solution is accelerated by the organic materials such as the carbonaceous and oily matters contained in the spent catalyst with evolution of heat of oxidation reaction.

The relative volume of the extractant solution to be admixed with the spent catalyst naturally depends on the contents of the objective metal values but usually from about 10 to 50 liters of the extractant solution are required for the extraction treatment of 1 kg of the spent catalyst although larger volumes of the extractant solution should be used when more complete extraction of the metal values is desired.

The extraction may be carried out at room temperature although it is optional to carry out the treatment at an elevated temperature of up to 50° C. Higher temperatures are undesirable due to the increased extraction of aluminum with consequent decrease in the selectivity of the extraction of the molybdenum and vanadium values. The extraction is usually complete within 1 hour.

The extract solution obtained by filtration of the extraction mixture contains almost exclusively the metal values of the molybdenum and vanadium with extremely small contents of nickel, cobalt, aluminum and other metallic ingredients so that the recovery of the molybdenum and vanadium values from the solution, if desired, is a relatively easy matter according to a known procedure. For example, the vanadium value can be precipitated in the form of ammonium vanadate by adding an ammonium salt to the extract solution followed by filtration and the filtrate solution is then acidified to precipitate the molybdenum value in the form of molybdic acid.

It has been unexpectedly discovered that, for some unknown reasons, the once solubilized and extracted cobalt and aluminum constituents are again insolubilized when the extraction treatment is prolonged so that the selectivity of the extraction of molybdenum and vanadium values relative to cobalt and aluminum can be improved by extending the time of extraction over 30 minutes or, preferably, over 1 hour.

In the following, examples are given to illustrate the method of the present invention in further detail by way of laboratory experiments but the process of the inventive method can of course be enlarged to any industrial scale.

In the following examples, a single kind of the spent catalyst discharged from the desulfurization process of heavy oil was used for the experiments in order that the influences of various parameters can be better exhibited without being affected by the composition of the spent catalyst. The analytical results for the main ingredients in this spent catalyst were as shown in Table 1 below and the spent catalyst was used as pulverized to pass a 48 mesh screen by the Tyler standard.

TABLE 1

| Component | Mo | V | Ni | Co | Al | S | C |
|---|---|---|---|---|---|---|---|
| Content, % by weight | 4.12 | 6.94 | 2.01 | 0.51 | 22.7 | 9.21 | 16.3 |

EXAMPLE 1

Into a beaker of 100 ml capacity was taken 1 g of a finely pulverized powder of the spent catalyst and 50 ml of an aqueous sodium carbonate solution in a concentration varied as indicated in Table 2 below and 10 ml of a 30% aqueous hydrogen peroxide solution were introduced thereto. The mixture was agitated for 60 minutes at room temperature to complete extraction and the extract solution after filtration was analyzed by the atomic absorption spectrophotometry to determine the concentration of each of the metal ingredients, from which the percent extraction for the element was calculated to give the results summarized in Table 2.

TABLE 2

| Concentration of sodium carbonate, g $Na_2CO_3$/liter | % Extraction | | | | |
|---|---|---|---|---|---|
| | Mo | V | Ni | Co | Al |
| 10 | 99.0 | 77.8 | 0.15 | 0.25 | 0.01 |
| 20 | 99.2 | 79.3 | 0.10 | 1.04 | 0.63 |
| 40 | 99.6 | 80.7 | 0.16 | 2.31 | 1.36 |

TABLE 2-continued

| Concentration of sodium carbonate, g Na₂CO₃/liter | % Extraction | | | | |
|---|---|---|---|---|---|
| | Mo | V | Ni | Co | Al |
| 80 | 99.4 | 82.1 | 0.29 | 3.69 | 1.97 |
| 160 | 99.5 | 85.0 | 0.56 | 4.86 | 1.86 |

The extraction of molybdenum was little affected by the concentration of sodium carbonate at least in the range from 10 to 160 g/liter and invariably at least 99% while the extraction of vanadium somewhat increased with the increase in the concentration of sodium carbonate. The selectivity of the extraction of these elements is very high with very small extraction of nickel, cobalt and aluminum.

EXAMPLE 2

Extraction was carried out in about the same manner as in Example 1 with 1 g of the powdered spent catalyst suspended in an extractant solution prepared from 50 ml of a 200 g/liter aqueous solution of sodium carbonate and a volume of a 30% aqueous solution of hydrogen peroxide to give a desired concentration of hydrogen peroxide indicated in Table 3 which summarizes the results of the percent extraction for each of the elements analyzed.

TABLE 3

| Concentration of hydrogen peroxide, % H₂O₂ by weight | % Extraction | | | | |
|---|---|---|---|---|---|
| | Mo | V | Ni | Co | Al |
| 0 | 43.8 | 57.6 | 0.69 | 1.53 | 2.46 |
| 0.6 | 80.0 | 71.3 | 0.70 | 5.00 | 1.93 |
| 1.2 | 92.4 | 74.9 | 0.70 | 6.18 | 1.87 |
| 2.4 | 97.3 | 80.0 | 0.69 | 5.75 | 1.72 |
| 4.8 | 99.5 | 84.3 | 0.65 | 4.90 | 1.89 |
| 7.2 | 99.5 | 85.0 | 0.64 | 3.92 | 2.25 |

As is clear from the table, substantial increase was noted in the extraction of molybdenum and vanadium with the increase in the concentration of hydrogen peroxide while the extraction of cobalt was the largest at 1.2% of the hydrogen peroxide concentration decreasing by further increase of the hydrogen peroxide concentration. Almost no influences were noted in the extraction of nickel and aluminum with the change in the hydrogen peroxide concentration.

EXAMPLE 3

A series of experiments of extraction were undertaken with varied times of 15 to 240 minutes for the extraction each with 2 g of the powdered spent catalyst suspended in 100 ml of a 180 g/liter aqueous solution of sodium carbonate admixed with 20 ml of a 30% aqueous hydrogen peroxide solution in a similar manner to Example 1. Table 4 below summarizes the results of the percent extraction of each of the metallic elements as a function of the extraction time.

TABLE 4

| Time of extraction, minutes | % Extraction | | | | |
|---|---|---|---|---|---|
| | Mo | V | Ni | Co | Al |
| 15 | 96.3 | 82.7 | 0.67 | 7.57 | 2.64 |
| 30 | 99.1 | 83.4 | 0.64 | 4.67 | 2.26 |
| 60 | 99.5 | 84.7 | 0.64 | 4.40 | 2.07 |
| 120 | 99.8 | 84.5 | 0.64 | 3.92 | 1.72 |
| 240 | 99.8 | 84.5 | 0.64 | 3.55 | 1.43 |

As is shown in the table, the extraction of molybdenum and vanadium levelled off at about 60 minutes while the extraction of nickel was almost constant for the time of 15 to 240 minutes and, rather unexpectedly, the extraction of cobalt and aluminum showed considerable decrease when the time of the extraction was extended. A conclusion obtained from these experiments is that the extraction should be carried out for at least 30 minutes or, preferably, 60 minutes when a high selectivity is desired for the extraction of molybdenum and vanadium values over nickel, cobalt and aluminum.

What is claimed is:

1. A method for selectively recovering molybdenum and vanadium values from a spent catalyst used for the hydrogenation desulfurization of petroleums containing molybdenum, vanadium, nickel and cobalt values supported by or deposited on an alumina catalyst carrier which comprises (a) suspending and agitating the spent catalyst in an aqueous extractant solution of sodium carbonate and hydrogen peroxide to effect selective extraction of the molybdenum and vanadium values into the aqueous solution and (b) separating the aqueous solution from the undissolved residue.

2. The method as claimed in claim 1 wherein the concentration of the sodium carbonate in the aqueous extractant solution is in the range from 10 to 200 g/liter.

3. The method as claimed in claim 1 wherein the concentration of the hydrogen peroxide in the aqueous extractant solution is in the range from 1 to 10% by weight.

4. The method as claimed in claim 1 wherein the aqueous extractant solution is used in a volume of at least 10 liters per kg of the spent catalyst.

5. The method as claimed in claim 1 wherein the step (a) is carried out at room temperature.

6. The method as claimed in claim 1 wherein the step (a) is carried out for at least 30 minutes.

7. The method as claimed in claim 1 wherein the concentration of the sodium carbonate in the aqueous extractant solution is in the range from 10 to 200 g/liter, and the concentration of the hydrogen peroxide in the aqueous extractant solution is in the range from 1 to 10% by weight.

8. The method as claimed in claim 7 wherein the step (a) is carried out at room temperature.

9. The method as claimed in claim 8 wherein the step (a) is carried out for at least 30 minutes.

10. The method as claimed in claim 1 wherein the extraction of nickel values into the aqueous extractant in step (a) is less than about 1%.

* * * * *